United States Patent
Seatovic et al.

(10) Patent No.: US 7,948,433 B2
(45) Date of Patent: May 24, 2011

(54) CALCULATION METHOD FOR NETWORK-SPECIFIC FACTORS IN A NETWORK OF REFERENCE STATIONS FOR A SATELLITE-BASED POSITIONING SYSTEM

(75) Inventors: Dejan Seatovic, Winterthur (CH); Paul Alves, Calgary (CA); Frank Takac, Belgach (CH); Hans-Jurgen Euler, Heerbrugg (CH); Benedikt Zebhauser, Rorschach (CH)

(73) Assignee: Leica Geosystems AG, Heerbrugg (CH)

( * ) Notice: Subject to any disclaimer, the term of this patent is extended or adjusted under 35 U.S.C. 154(b) by 171 days.

(21) Appl. No.: 12/304,264

(22) PCT Filed: May 30, 2007

(86) PCT No.: PCT/EP2007/004796
§ 371 (c)(1),
(2), (4) Date: May 5, 2009

(87) PCT Pub. No.: WO2007/144071
PCT Pub. Date: Dec. 21, 2007

(65) Prior Publication Data
US 2010/0001903 A1    Jan. 7, 2010

(30) Foreign Application Priority Data
Jun. 13, 2006   (EP) .................................. 06115386

(51) Int. Cl.
*G01S 19/14* (2010.01)

(52) U.S. Cl. .................................................. 342/357.52
(58) Field of Classification Search ............. 342/357.24, 342/357.52
See application file for complete search history.

(56) References Cited

U.S. PATENT DOCUMENTS

| | | | |
|---|---|---|---|
| 7,031,730 B1 * | 4/2006 | Barber et al. | 455/457 |
| 2007/0241957 A1 * | 10/2007 | Murphy | 342/357.02 |
| 2009/0027264 A1 * | 1/2009 | Chen et al. | 342/357.12 |

* cited by examiner

*Primary Examiner* — Thomas H Tarcza
*Assistant Examiner* — Harry Liu
(74) *Attorney, Agent, or Firm* — Maschoff Gilmore & Israelsen

(57) ABSTRACT

A correction calculation method for a satellite based positioning system with a network of receiving units as reference stations comprises a partitioning of the network into groups of reference stations, calculation of group-specific correction factors, amalgamation of the group-specific correction factors and subsequently, derivation of network-specific correction parameters. In this partitioning, the reference stations are represented by nodes in a connected, edge-weighted graph, in the generation of which an edge respectively connecting two nodes is only generated if it satisfies a distance-dependent connectivity condition, whereby the distance between the nodes connected by this edge is input into the weighting function of this edge. From the graph a minimum spanning tree is derived and subsequently partitioned for establishing the groups.

12 Claims, 4 Drawing Sheets

CALCULATION METHOD FOR NETWORK-SPECIFIC FACTORS IN A NETWORK OF REFERENCE STATIONS FOR A SATELLITE-BASED POSITIONING SYSTEM

The invention relates to a calculation method for network-specific variables in a network of reference stations for a satellite-based positioning system according to claim 1 and a computer program product.

Global or satellite-based positioning systems GNSS (e.g. GPS, GLONASS, Galileo, etc) are used at present or will be used in the future for many applications for position determination. Owing to the physical conditions, the achievable accuracy of position on reception by a station operated in isolation is limited.

In the case of differential GNSS, the position determination of a mobile unit, the so-called rover, is effected by data reception and data measurement to satellites as well as data reception of data measurements of at least one reference station. Since the position of the reference station is known and this too receives the identical signals of the satellites, some inaccuracies and errors can be reduced by the differential correction method. Examples of such errors are ionospheric or tropospheric errors or geometric errors arising from the satellite orbits. By means of differential methods, a higher accuracy is possible than would be possible with a rover without a reference station. Such a station transmits data from the received satellite signals continuously to the rover. Depending on the design, this may be raw data or already processed data. In practice, however, reference stations are not installed anew for each measuring process but a whole network of fixed-installation reference stations which can also be used simultaneously by different users forms a basis. Thus, either network correction parameters are transmitted from networks or data for virtual reference stations which correspond to a station located in the vicinity of the rover are calculated from the measurements of the reference stations in the network. U.S. Pat. No. 5,899,957 describes a method and an apparatus for transmitting GPS correction distances for a selected region. The document also contains a broad overview of the prior art for this approach.

A network of reference stations is also described in Zebhauser B. E., Euler H.-J., Keenan C. R., Wübbena G. (2002), "*A Novel Approach for the Use of Information from Reference Station Networks Conforming to RTCM V2.3 and Future V3.0*", ION (US Institute of Navigation), National Technical Meeting 2002, San Diego.

Such networks generally have large numbers of reference stations for which simultaneous data processing is not possible owing to the limited computational power, in particular in the case of PC-based systems. The number of simultaneously processable stations is thus smaller than a total number of stations of a network. A network is therefore partitioned, i.e. divided into groups or clusters of jointly processable reference stations, for data processing purposes, the composition of the groups having to meet certain criteria, for example regarding the errors occurring.

The reference stations of a group or of a cluster should generally be close together, so that the geographical distribution is a substantial criterion for the partitioning of the reference stations. A further criterion is the requirement that the geographic distribution or the area assigned to the group should have a spherical form. At present, group sizes of 4 to 8 reference stations are desirable, where this limitation is to be designated as a cardinality condition. Thus, if the partitioning generates a group whose size is within this specified latitude, no further partitioning is effected for this group. In the extreme case, it is of course also possible to specify a single quantity instead of a value range, so that—assuming corresponding divisibility—all groups are of the same size after the partitioning.

The object of the present invention is to provide an improved calculation method for correction information for a satellite-based positioning system.

A further object is to permit an automatic or dynamic partitioning of the network of reference stations.

A further object is to improve the robustness of the network, in particular with regard to the failure of reference stations.

These objects are achieved, according to the invention, by the characterising features of claim 1 or of the dependent claims or the solutions are further developed.

The invention relates to a calculation method for network-specific variables in a network of reference stations for a satellite-based positioning system according to claim 1 and a computer program product for carrying out the calculation method.

Owing to the changes in the network, such as, for example, the failure or the switching off/switching on of reference stations, it is advisable to design an automatic, in particular dynamic, partitioning of the network, according to the invention. Changes in the network architecture or network functionality can then be monitored in real time. The dynamic partitioning according to the invention can then be effected, for example, in an event-controlled manner or at a fixed rate. Moreover, dynamic partitioning is a precondition for inclusion of mobile receiver units, so-called rover units, in the network. Since these are not statically positioned, an appropriately updatable and flexible partitioning is required.

The partitioning of a totality of reference stations into groups or clusters can be expressed in its general form as follows What is given is a set x of n objects or reference stations $(x_1, \ldots, x_n) =: x$, in the case of points or locations in d-dimensional space, $x_j = (x_{j1}, \ldots, x_{jd})$ is also true a cost function $H: \{1, \ldots, k\}^n \to \Re$, which expresses the costs of assignment of an object to a group, the assignment regarding objects dissimilar to the other group objects incurring higher costs than the assignment of similar objects.

What is sought is an assignment factor $c \in \{1, \ldots, k\}^n$ where $c_j = j \leftrightarrow x_j$ is assigned to the group j $c = \arg \min_c H(c \backslash x)$ So-called clustering methods for the formation of groups from a partitioning of objects differ according to their approaches to the representation of the objects, for example vectorially in a euclidean space or in a distance matrix, the choice of a cost function, e.g. L2 standard or Kullback-Leibler divergence, and the optimisation or assignment algorithm. Known approaches are, for example, k-means clustering or principle component analysis.

According to the invention, the network of reference stations is modelled as a cohesive and edge-weighted graph in which the reference stations represent the nodes connected by edges. Here, the distance between the respective reference stations connected by the edge is input into the weight function assigned to the edges, it being possible according to the invention to use in particular a L2 or euclidean standard. In principle, however, other standards or measured distances stored in a directory can also be used, it being possible for the distances already to be provided with corrections. Moreover, further variables, such as, for example, antenna or reception parameters, altitudes of the reference stations, number of measurements, number of systems used, such as, for example, GLONASS, GPS, Galileo, etc, and topography-specific or atmospheric parameters, can also be input into the weight function. Topography-specific parameters are dependent on the topography between the reference stations, such as, for example, the presence of mountains or closeness to a coast. Such variables can be derived, for example, from digital terrain or altitude models and describe a corresponding influence, for example on the modelling of atmospheric effects. Atmospheric parameters either can be derived from local measurements for the reference stations or describe the conditions for a larger environment in which the reference stations are located, in a grid or area.

In the generation and partitioning of the graph, two conditions should be noted and taken into account algorithmically. Firstly, a cohesive graph must be generated as a starting condition; this means that all nodes of the graph are connected to one another directly or indirectly, i.e. via further nodes and edges, which is designated as a connectivity condition. Secondly, groups of a certain number of objects or reference stations should be generated on partitioning, it being necessary for this number to correspond to a specified value range. This condition is designated as a cardinality condition.

For generating the cohesive graph, in principle all nodes are initially connected by edges, but preselection can be taken into account, which reduces the number of actual connections. An example of such a connective preselection which is of relevance especially with regard to optimisations of calculation time, requires that, on specification of a suitable distance threshold, the connectivity condition applies and a cohesive graph results without connecting each node to all other nodes by edges in each case in a trivial manner. Usually, for generating the connective graph, all nodes whose distance is below this distance threshold are connected to one another by edges. If the distance threshold fulfils the connectivity condition for a given network, a graph which is connected and hence connects together all nodes indirectly or directly, i.e. via further nodes, follows. A typical magnitude for this distance threshold is 70 km. If the distance threshold is chosen too large, the number of edges to be calculated is too high; if on the other hand it is chosen too small, it is possible that no cohesive graph will result and hence the connectivity condition will be infringed or not maintained. The distance threshold can therefore be on average 70 km but also up to 100 km or greater. The latter is the case, for example, for networks in which carrier phase observations have to be evaluated and their integral ambiguities have to be determined in real time—i.e. with not more than a few minutes delay. In the case of networks without the determination of such integral ambiguities from the evaluation of carrier phase observations and networks only with evaluation of observations other than carrier phases, i.e. for example code phase observations, this distance threshold may also be a multiple of these magnitudes, i.e. typically 150 or 300 km. An automatic determination can therefore be effected according to the availability of observation types, i.e. the observables, and/or according to the data products of these networks which are to be generated. A simple link is a reference table with distance threshold and associated values for available observation types or data products to be generated. The distance threshold is then chosen according to observables present or data products to be realised.

Suitable variables for deriving corresponding data products and calculatable criteria for distance thresholds are discussed in the prior art.

Thus, the derivation of a correlation distance, based on the error influence of ionospheric refraction, is described in Skone S. H. (2001), "*The impact of magnetic storms on GPS receiver performance*", Journal of Geodesy 75 (2001) 9/10, 457-468.

The determination of distance-dependent errors and hence a variable suitable for deriving and establishing the distance threshold and information on the resolvability of carrier phase ambiguities are disclosed in Wubbena, Bagge, Seeber, Böder, Hankemeier (1996), "*Reducing Distance Dependent Errors for Real-Time Precise DGPS Applications by Establishing Reference Station Networks*", paper presented at ION 96, Kansas City, and Georgiadou Y. & Kleusberg A. (1998) "*On the effect of ionospheric delay on geodetic relative GPS positioning*", 1987, manuscripts geodetica (1988) 13: 1-8.

The cohesive and edge-weighted graph thus generated is subsequently partitioned, i.e. divided into groups of reference stations, a few to very many partitioning steps having to be carried out, depending on the number of reference stations and chosen cardinality condition, until all groups fulfil the cardinality condition.

As a first step after the generation, edges are removed in the graph by deriving a minimum spanning tree. Various approaches are suitable for this purpose, in particular greedy approaches which in each case select the locally best solution being used according to the invention, owing to the transit time behaviour. Examples of these are the algorithms of Prim or Kruskal, as described, for example, in "*Introduction to Algorithms*" by Thomas A. Cormen, Charles E. Leiserson, Ronald Rivest, Clifford Stein, The MIT Press, $2^{nd}$ Edition, ISBN: 0262032937, pages 567-573.

The use of minimum spanning trees has some advantages
  partitioning algorithms for minimum spanning trees are fast (O(|E|log|V|),
  the partitioning can be effected in one pass,
  cardinality and connectivity conditions can be integrated easily or with little effort.

The edge having the highest weight is then removed from the derived minimum spanning tree, provided that the partial trees which then result do not fall below the lower limit of the cardinality condition. The partial trees formed thereby are then further partitioned according to the same principle, provided that they do not exceed the upper limit of the cardinality condition, until the cardinality condition is fulfilled for all partial trees finally resulting. Partial trees which satisfy this condition represent the groups of reference stations which are to be established by the partitioning. The partitioning procedure ends when all partial trees fulfill the cardinality condition or when further admissible partitioning can no longer be effected, for example when one or more remaining partial trees to be partitioned can no longer be partitioned while maintaining the cardinality condition. This is the case, for example, when a partial tree contains 9 nodes and the cardinality condition requires groups having a strength of 5 nodes as the lower limit and 7 nodes as the upper limit.

In order to avoid such situations of partial trees which are to be partitioned and whose number of nodes is greater than the upper limit of the cardinality condition but which would not be capable of being partitioned while falling below the lower limit of the cardinality condition, the cardinality condition can be chosen according to $$\frac{n_{max}}{2} \geq n_{min}$$

as a further criterion, where $n_{max}$ is the upper limit and $n_{min}$ is the lower limit of the cardinality condition. As a result of using this rule, resulting partial trees can be partitioned until they satisfy the cardinality condition.

The partitioning is followed by the separate calculation of group-specific correction variables for the groups, which correction variables are subsequently combined again for deriving network-specific correction parameters. One approach for this is the use of reference stations which are assigned to more than one group or belong to this. For this purpose, on removal of an edge, one of the two stations connected by these edges is regarded as belonging to both of the resulting groups or partial trees and accordingly taken into account in the calculation of correction parameters.

The calculation method according to the invention is described in more detail below, purely by way of example, with reference to working examples shown schematically in the drawing. Specifically, FIG. 1 shows a schematic diagram of the transmission of corrections with a network of reference stations;

Figure 1:
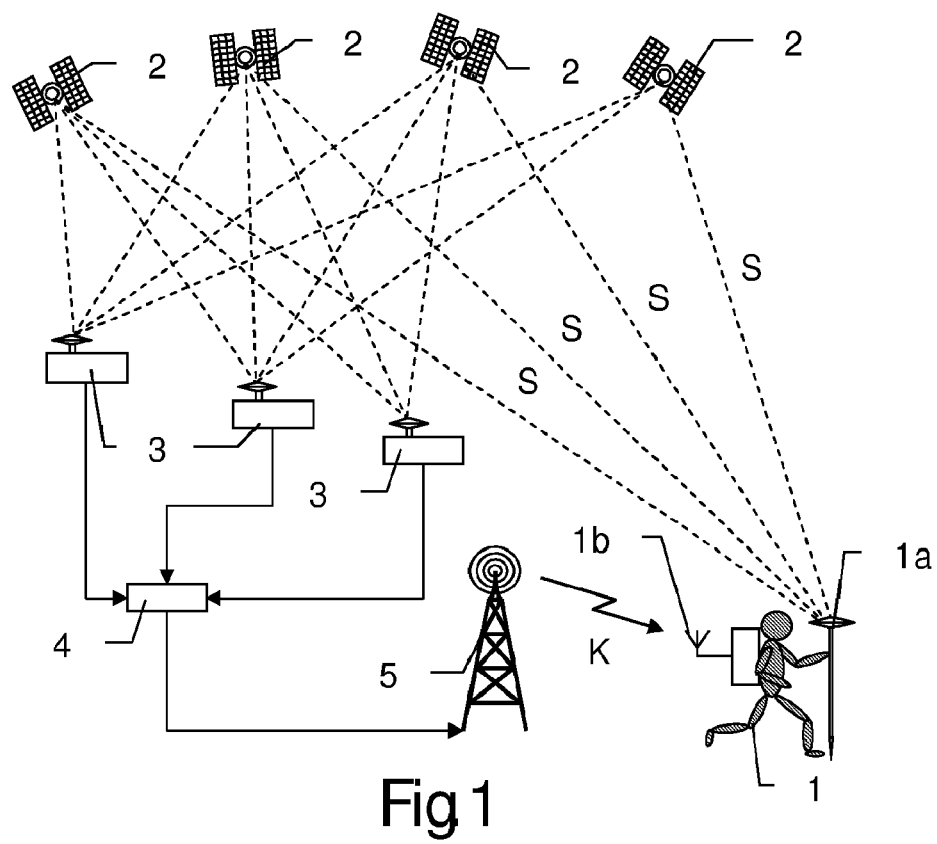

FIG. 1 schematically shows the calculation and transmission of corrections K from a network of reference stations 3 to a mobile rover unit 1 as a receiving unit according to the prior art. Both the rover unit 1 and the reference stations receive satellite signals S from satellites 2 of a global positioning system. The satellite signals S received in the network are processed locally or in groups and passed on as group-specific corrections to a central calculation unit 4. A calculation of network-specific corrections K is effected there, the network-specific corrections K subsequently being transmitted by a transmitter 5 of a transmitting unit to a receiver 1a of the rover unit 1. The network-specific corrections K received serve there for increasing the positional accuracy on the basis of the satellite signals S received by a satellite receiver 1a of the rover unit 1. In spite of the representation chosen here and comprising a network having a transmitter 4 and unidirectional communication, the calculation method according to the invention is also suitable for bidirectional communication.

Figure 2:
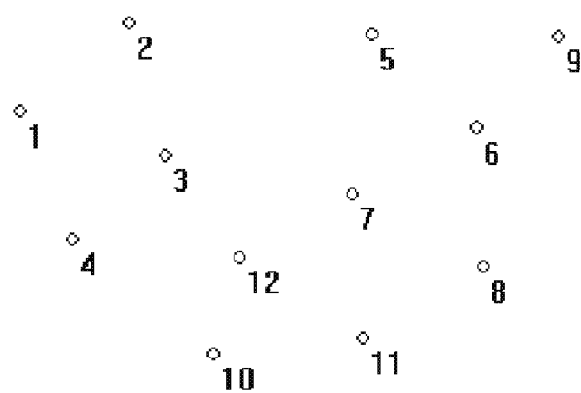
FIG. 2 shows an example of a network of reference stations which is to be partitioned.

FIG. 2 shows an example of a network of twelve consecutively numbered reference stations which is to be partitioned into groups, which example is simplified for the sake of clarity. The cardinality condition should specify groups of 2 to 4 reference stations as being admissible. In this case, the connectivity condition is stipulated as 70 km by way of example.

Figure 3:
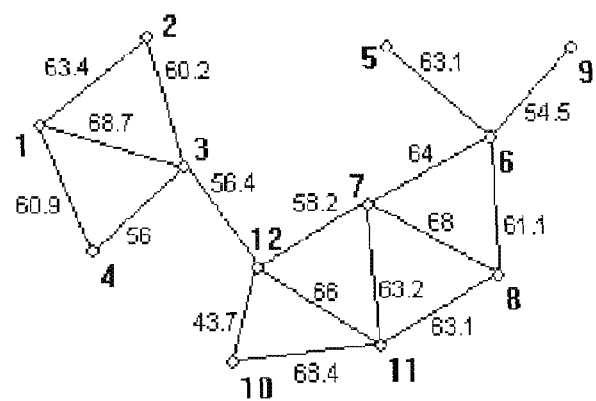
FIG. 3 shows a schematic diagram of the generation of a cohesive, edge-weighted graph for the network.

The first step of the calculation method with the generation of a cohesive, edge-weighted graph for the network is effected in a schematic diagram in FIG. 3. All nodes which represent reference stations and are less than 70 km away are connected by edges which here in this example carry the distance between the nodes as a weight. The euclidean distance is stated, and further parameters, such as, for example, atmospheric, antenna-related or geographical influences, can also be input into the weighting function but, for the sake of clarity, are not shown here. The result of the first step is thus a cohesive, edge-weighted graph, only the distance having been considered as a weighting function.

Figure 4:
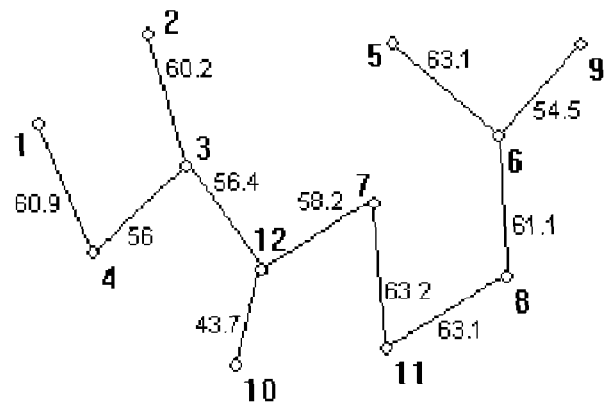
FIG. 4 shows a schematic diagram of the derivation of a minimum spanning tree for the graph representing the network.

FIG. 4 schematically shows the derivation of a minimum spanning tree for the graph representing the network. In this example, a minimum spanning tree is derived using the Prim algorithm known from the prior art, starting from node 1. For carrying out the procedure, in each case an outer limit is drawn around the nodes already belonging to the resulting spanning tree and, from all edges intersecting this limit, the edge having the lowest weight is chosen for extending the spanning tree. The node connected to this edge is added to the spanning tree. In this example, three edges cross an imaginary ring around node 1, of which the edge to node 4 with 60.9 has the lowest weight, so that node 4 with the corresponding edge is added to the spanning tree. A line drawn around nodes 1 and 4 now intersects two of the original three edges and the edge between nodes 4 and 3 having the weight 56. Since this has the edge with the lowest weight, this is added together with node 3 to the spanning tree. Since nodes 1 and 3 are connected via node 4, the direct edge between nodes 1 and 3 can be removed. According to this progressive approach, the minimum spanning tree is derived, but it is also possible according to the invention to use other approaches, such as, for example, also other greedy methods, such as, for example, the Kruskal algorithm.

Figure 5:
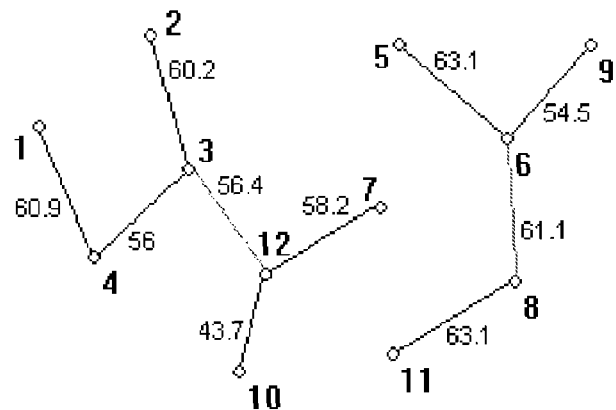
FIG. 5-6 show a schematic diagram of the partitioning of the minimum spanning tree.
Figure 6:
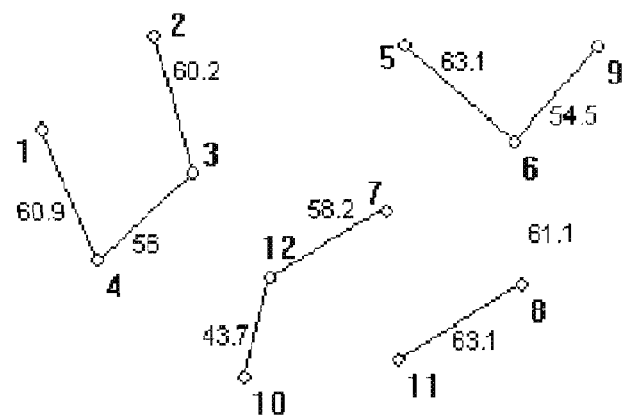

FIG. 5 explains the partitioning of the minimum spanning tree on the basis of a schematic diagram. In the graph, the edge having the highest weight is identified, in this example the edge between nodes 7 and 11, which has a weight of 63.2. Since the two partial trees resulting from the distance of the edge and having 5 and 7 nodes cannot yet fulfil the cardinality condition, they are further subdivided, which is illustrated in FIG. 6.

In the left partial tree, the edge having the weight of 56.4 between nodes 3 and 12 is removed since the heavier edges having the weight of 60.9 between nodes 1 and 4, having the weight of 60.2 between nodes 2 and 3 and finally having the weight 58.2 between nodes 12 and 7 cannot be removed without the graphs then formed infringing the cardinality condition or cannot be further partitioned. This means that it is permissible to remove an edge precisely when it is the heaviest edge which, after removal, leads to partial trees which either fulfil the cardinality condition or can be further partitioned. The two groups resulting from the removal of the edge having the weight 56.4 have 4 and 3 nodes so that the cardinality condition is fulfilled for both parts and no further partitioning is required.

For the right partial tree, the edge having the weight of 61.1 is likewise not the heaviest edge. However, it is the heaviest which can be removed without infringing the cardinality condition or which then leaves behind graphs which can be further partitioned. In this case, the removal of the edge leads to two groups having 2 and 3 nodes, which in both cases satisfies the cardinality condition. Through the representation as a graph and a subsequent algorithmic partitioning, a network of reference stations can be automatically partitioned. In particular, a continuous or repeated and hence dynamic adaptation of the network to actual operating conditions is possible by repeatedly carrying out the calculation step or its partitioning step with subsequent calculation of group- and network-specific correction.

Figure 7:
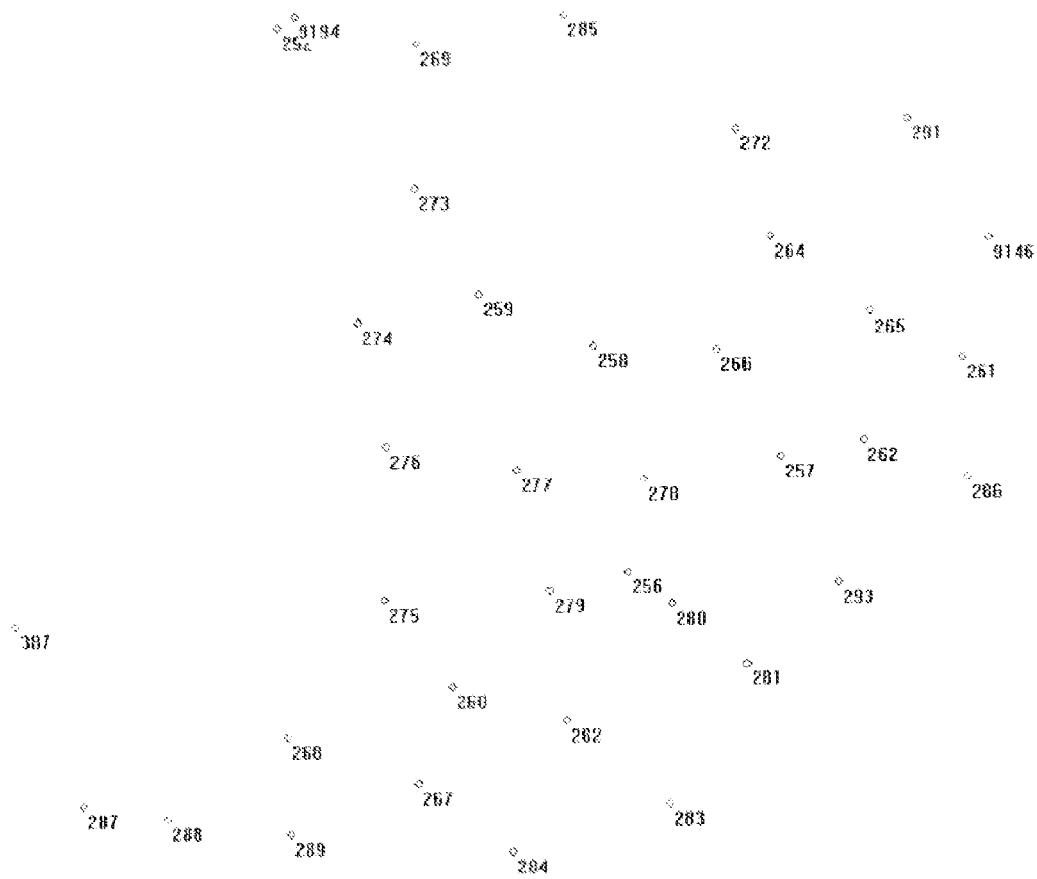
FIG. 7 shows a schematic diagram of a real example of a network of reference stations which is to be partitioned into groups.
Figure 8:
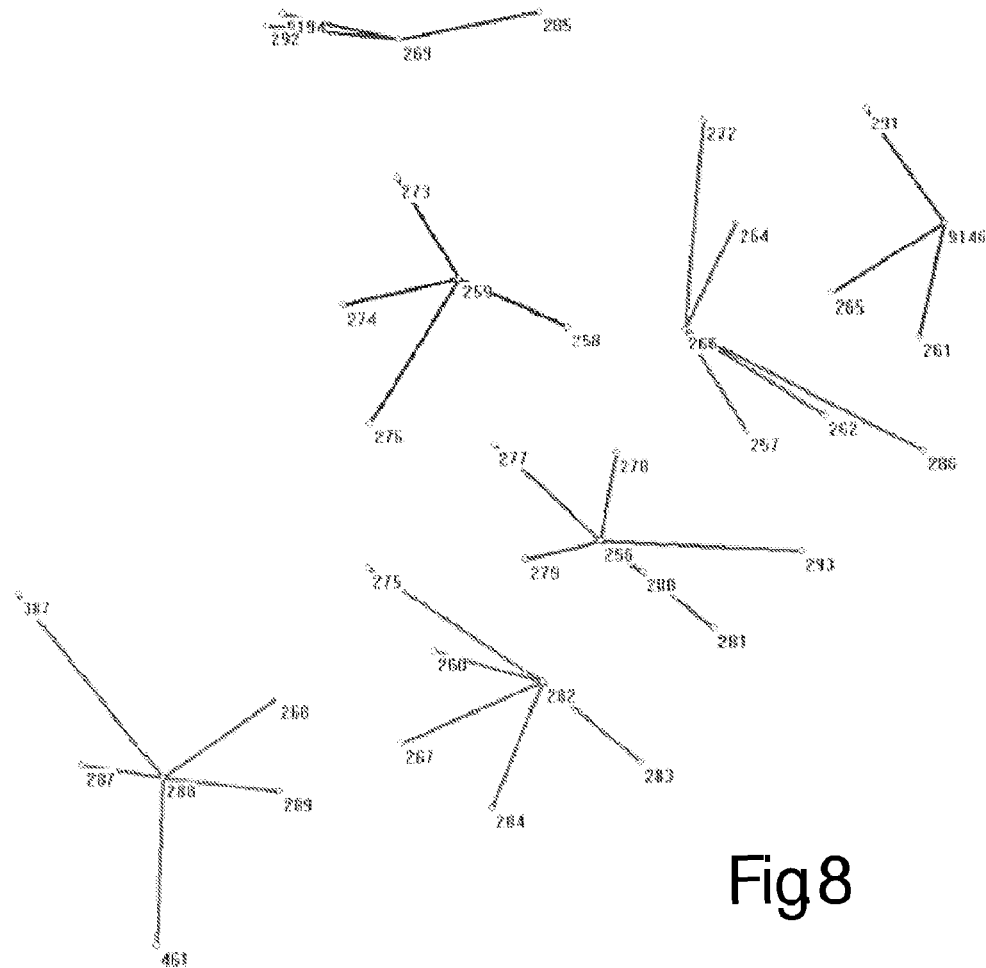
FIG. 8 shows a diagram of the network of reference stations of the real example, which network has been partitioned into groups.

FIG. 7 shows a real example of a network to be divided into groups and having a larger number of reference stations, which network covers the German federal Land of Bavaria and is shown in FIG. 8 in the partitioned state. The altitude distribution of the reference stations was neglected and the connecting lines shown in each case to a central station in each group serve only by way of illustration.

Figure 9:
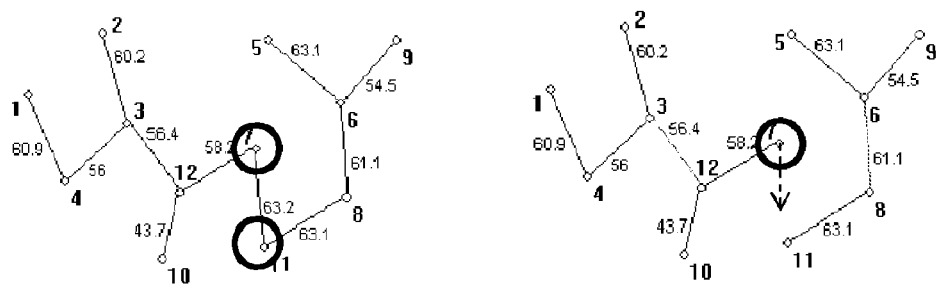
FIG. 9 shows a schematic diagram of the determination of reference stations which belong to at least two groups on partitioning.

FIG. 9 shows, as an example, the determination of reference stations which on partition belong to at least two groups. For this purpose, during partitioning of the minimum spanning tree, in each partitioning step one of the two nodes of an edge to be removed is assigned to both resulting partial trees so that links result between the partial trees and hence also the groups, which links in turn permit combination of the group-specific corrections with a view to the calculation of network-specific corrections. In the left partial picture in FIG. 9, the edge having the weight 63.2 between nodes 7 and 11 is removed. Of the two nodes, node 7 is considered as belonging to both groups, as indicated in the right partial picture, and is processed computationally. The inclusion of such "redundant" nodes which belong to a plurality of partial trees or groups can take place both during the partitioning process itself, for example by adaptation of the cardinality condition, or only after partitioning is complete, for example by assigning the common nodes also to their respective second group only after the partitioning. In the latter case, the partitioning algorithm need not take any account of the multiple affiliation.

In spite of the system-specific examples chosen, the method can in principle also be used according to the invention for any satellite-based positioning systems, such as, for example, a GPS, Galileo or GLONASS.

The invention claimed is:

1. A correction calculation method performed by a computer processor for a satellite-based positioning system including a network of receiving units as reference stations, the method comprising:
   partitioning the network into groups of reference stations;
   calculating group-specific correction variables;
   combining the group-specific correction variables; and
   deriving network-specific correction parameters, wherein during partitioning:
      the reference stations are represented by nodes in a cohesive, edge-weighted graph, in the generation of which the removal of the nodes connected by this edge being input into the weighting function;
      a minimum spanning tree is derived from the graph; and
      the minimum spanning tree is partitioned for establishing the groups by eliminating from a tree in each case the edge which has the highest weight and the elimination of which leads to partial trees which in each case either:
         satisfy a cardinality condition for the number of nodes having a lower limit $n_{min}$ and an upper limit $n_{max}$, in both the resulting partial trees; or
         have a number of nodes which is greater than the cardinality condition.

2. A correction calculation method according to claim 1, wherein the minimum spanning tree is derived from the graph according to the Prim or Kruskal algorithm.

3. A correction calculation method according to claim 1, wherein an edge connecting two nodes is generated only if the distance between the nodes does not exceed a specified distance threshold.

4. A correction calculation method according to claim 3, wherein all edges which do not exceed the distance threshold are generated in the graph.

5. A correction calculation method according to either of claims 3, wherein the distance threshold is determined automatically as a function of an availability of observation data and/or of network data products to be generated.

6. A correction calculation method according to claim 1, wherein an edge connecting two nodes is generated only if the eclidean distance between the nodes does not exceed a specified distance threshold.

7. A correction calculation method according to claim 1, wherein parameters of the reference stations, parameters derived from observation data of the reference stations, topography-specific parameters, and/or atmospheric parameters are input into the weighting function.

8. A correction calculation method according to claim 1, wherein, as a cardinality condition, the number of permissible nodes is in the range of 4 to 8.

9. A correction calculation method according to claim 1, wherein the cardinality condition is chosen so that:

$$\frac{n_{max}}{2} \geq n_{min}.$$

10. A correction calculation method according to claim 1, wherein, during partition, at least one reference station is assigned to at least two groups.

11. A correction calculation method according to claim 1, wherein at least some of the receiving units of the network are mobile receiving units.

12. A computer program product as a record on a data medium having code sequences for carrying out the correction calculation method according to claim 1.

* * * * *